United States Patent
Schindler et al.

(10) Patent No.: US 9,446,653 B2
(45) Date of Patent: Sep. 20, 2016

(54) ADJUSTABLE WHEEL SUSPSENSION FOR THE WHEELS OF AN AXLE OF A MOTOR VEHICLE

(71) Applicant: AUDI AG, Ingolstadt (DE)

(72) Inventors: Andreas Schindler, Ingolstadt (DE); Heinrich Beringer, Denkendorf (DE); Ruben Goldberg, Ingolstadt (DE); Joachim Schmitt, Ingolstadt (DE); Christian Isakiewitsch, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/407,863

(22) PCT Filed: May 25, 2013

(86) PCT No.: PCT/EP2013/001548
§ 371 (c)(1),
(2) Date: Dec. 12, 2014

(87) PCT Pub. No.: WO2013/185883
PCT Pub. Date: Dec. 19, 2013

(65) Prior Publication Data
US 2015/0191071 A1 Jul. 9, 2015

(30) Foreign Application Priority Data
Jun. 15, 2012 (DE) .................. 10 2012 011 919

(51) Int. Cl.
*B60G 21/055* (2006.01)
*B60G 17/02* (2006.01)

(52) U.S. Cl.
CPC ......... *B60G 21/0556* (2013.01); *B60G 17/025* (2013.01); *B60G 21/0555* (2013.01); *B60G 2206/60* (2013.01)

(58) Field of Classification Search
CPC .......... B60G 21/0551; B60G 21/0556; B60G 2202/135; B60G 2202/1351; B60G 2202/1362; B60G 2204/1222
USPC .................. 280/124.106, 124.107, 124.137, 280/124.149
See application file for complete search history.

(56) References Cited

U.S. PATENT DOCUMENTS 2,169,373 A * 8/1939 Porsche .................... 267/274
3,430,978 A * 3/1969 Fortier .................. 280/124.101
(Continued)

FOREIGN PATENT DOCUMENTS

DE 101 26 928 A1 12/2002
DE 102 42 552 A1 3/2004
(Continued)

OTHER PUBLICATIONS

Takema et al., Vehicle body Posture Control Device, Dec. 18, 2008, JPO, JP 2008-302731 A, Machine Translation of Description.*
(Continued)

*Primary Examiner* — James English
(74) *Attorney, Agent, or Firm* — Henry M. Feiereisen LLC.

(57) ABSTRACT

An adjustable wheel suspension for the wheels of an axle of a motor vehicle is disclosed, wherein each wheel is guided by means of wheel guide elements and each wheel is operatively connected to an adjustable torsion bar, the torsion bars associated with the respective wheels being partially aligned with each other and each torsion bar being associated with an adjusting device that can be regulated and/or controlled by a controller for adjustment and each torsion bar being mounted on an auxiliary frame via its adjusting device and the controller. The adjusting devices and the adjusting mechanism are mounted in a common housing, which can be mounted on the auxiliary frame as an integral structural component.

4 Claims, 1 Drawing Sheet

(56) References Cited

U.S. PATENT DOCUMENTS

| | | | |
|---|---|---|---|
| 4,094,532 A * | 6/1978 | Johnson et al. | 280/124.102 |
| 5,263,736 A * | 11/1993 | Stevens | 280/6.157 |
| 7,798,508 B2 * | 9/2010 | Wettlaufer, Jr. | 280/124.152 |
| 8,490,983 B2 | 7/2013 | Schmid et al. | |
| 8,684,381 B2 * | 4/2014 | Buhl et al. | 280/124.107 |
| 2004/0084857 A1 | 5/2004 | Vortmeyer | |
| 2011/0278811 A1 * | 11/2011 | Ohletz et al. | 280/124.106 |
| 2013/0099455 A1 | 4/2013 | Beringer et al. | |

FOREIGN PATENT DOCUMENTS

| | | |
|---|---|---|
| DE | 10 2004 002 550 A1 | 8/2005 |
| DE | 10 2004 053 364 A1 | 8/2006 |
| DE | 10 2006 001 709 A1 | 7/2007 |
| DE | 20 2006 016 344 U1 | 4/2008 |
| DE | 10 2007 007 214 A1 | 8/2008 |
| DE | 10 2007 024 770 A1 | 11/2008 |
| DE | 199 21 692 B4 | 12/2008 |
| DE | 10 2009 005 895 A1 | 7/2010 |
| DE | 10 2009 005 898 A1 | 7/2010 |
| DE | 10 2009 028 386 A1 | 2/2011 |
| DE | 10 2010 025 260 A1 | 12/2011 |
| EP | 0 779 204 A1 | 6/1997 |
| EP | 1 321 351 A2 | 6/2003 |
| EP | 2 517 905 A1 | 10/2012 |
| JP | 3070359 B2 | 7/2000 |
| JP | 2008-302731 | 12/2008 |

OTHER PUBLICATIONS

International Search Report issued by the European Patent Office in International Application PCT/EP2013/001548.

* cited by examiner

ADJUSTABLE WHEEL SUSPSENSION FOR THE WHEELS OF AN AXLE OF A MOTOR VEHICLE

CROSS-REFERENCES TO RELATED APPLICATIONS

This application is the U.S. National Stage of International Application No. PCT/EP2013/001548, filed May 25, 2013, which designated the United States and has been published as International Publication No. WO 2013/185883 and which claims the priorty of German Patent Application, Serial No. 10 2012 011 919.4, filed Jun. 15, 2012, pursuant to 35 U.S.C. 119(a)-(d).

BACKGROUND OF THE INVENTION

The invention relates to an adjustable wheel suspension for the wheels of an axle of a motor vehicle.

So-called active systems for steadying the body of a motor vehicle are amply known. For this purpose setting devices are usually used for rotating a torsion bar. Applying a torque on the torsion bar generates active forces, which can influence the rolling movement or the movement of the superstructure of the motor vehicle.

Thus, for example DE 101 26 928 A1, DE 10 2004 002 550 A1 or DE 102 42 552 B4 discloses corresponding arrangements for two-part stabilizers with an setting device for influencing the spring rates and the driving characteristics of motor vehicles. Hereby the rolling behavior or the incline of the motor vehicle in curves can be reduced by adjusting the divided torsion bars of the overall u-shaped stabilizers in opposite directions or the pitch movement for example during braking can be counteracted by adjustment in the same direction.

An adjustable wheel suspension of the generic type for the wheels of a motor vehicle is described in DE 10 2009 005 898 A1. Here each wheel of the axle is supported on a auxiliary frame via multiple wheel-guiding elements and is operatively connected with an adjustable torsion bar via its wheel-guiding elements. Each torsion bar is assigned an setting device via which torques can be applied on the torsion bar for example in order to counteract a rolling movement. For this purpose corresponding controllers are provided for open loop or closed loop control of the setting device. The components controller, setting device and torsion bar are each respectively fastened on the auxiliary frame. A disadvantage is here that the components require a large mounting space. A further disadvantage is that due to the direct fastening of the components controller, setting device and torsion bars on the auxiliary frame, the auxiliary frame has to be correspondingly reinforced and with this has to be constructed larger in the region of the fastening site in order to ensure absorption of the acting forces and torques.

A further adjustable wheel suspension for the wheels of a motor vehicle, which includes all features of patent claim 1, is disclosed in DE 10 2009 005 895 A1. An integration of the controller and setting device in a common housing is disclosed in DE 10 2009 028 386 A1.

SUMMARY OF THE INVENTION

The invention is based on the object to further improve an adjustable wheel suspension of the wheels of an axle of a motor vehicle according to the type set forth in the preamble of patent claim 1 so as to provide a space-saving arrangement of the components controller, setting device and torsion bars on the auxiliary frame and to enable a weight-saving configuration of the auxiliary frame.

This object is solved by an adjustable wheel suspension for the wheels of an axle of a motor vehicle, in which each wheel is guided via wheel guiding elements and each wheel is operatively connected with an adjustable torsion bar via its wheel guiding elements, wherein the torsion bars respectively assigned to the respective wheels are arranged so as to be aligned with each other in regions and are oriented in transverse direction of the vehicle and each torsion is assigned an setting device which can be regulated and/or controlled via a controller and wherein on a auxiliary frame the torsion bars are respectively supported via their setting device and the controller, wherein the setting devices and the torsion bars are arranged in a common housing which is fastenable on the auxiliary frame as integral component, characterized in that the common housing is configured and dimensioned so that the auxiliary frame can be constructed without a transverse member.

The dependent claims form advantageous refinements of the invention.

As is known, each wheel of the adjustable wheel suspension is guided via multiple wheel-guiding elements and each wheel of the axle is operatively connected with an adjustable torsion bar. To this end, the torsion bars assigned to the respective wheels are arranged so as to be aligned with each other in regions and are oriented in transverse direction of the vehicle. For the purpose of the adjustment, each rod is assigned an setting device, which can be controlled by open loop or closed loop control via a controller. In addition as is known the individual components are supported on a auxiliary frame securely fastened to the vehicle body, i.e., beside the controller the torsion bars are also fastened directly on the vehicle body fixed auxiliary frame via their assigned setting devices. In addition the torsion bars and the controller are arranged in a common housing which is fastened as integrated component on the auxiliary frame for example by means of a threaded connection.

The integration of the components torsion bars and controller in a common housing is particularly advantageous because in this case an arrangement which saves mounting space and and is easily mountable is realized. In addition the integration of the components in a common housing is advantageous because the housing absorbs acting forces and torques and thus a direct introduction into the auxiliary frame no longer takes place. This has the positive effect that smaller forces and torques have to be transmitted via the fastening sites housing-auxiliary frame, and as result the auxiliary frame can be produced lighter and with this more cost-effectively.

According to the invention the housing, which is oriented in transverse direction of the vehicle, is constructed and dimensioned so that the auxiliary frame can be constructed without a transverse member. The configuration and dimensioning according to the invention of the common housing now ensures that the housing additionally takes over the function of a auxiliary frame transverse member. This functional integration according to the invention in a transverse connecting housing beam thus allows omitting the usual front transverse member and the auxiliary frame construction can be particularly lightweight. A further advantage is that due to the transverse supporting effect of the housing beam a respective connection point can be omitted relative to the otherwise conventional 3-point support in the case of non-integrated arrangement of the setting device.

Preferably the housing is configured as a closed profile, for example having a circular, rectangular or triangular cross section. This configuration of the housing is particularly advantageous because this construction enables high stiffness, in particular bending stiffness, at low expenditure of material. Forces resulting from the actuating process are directly transmitted into the structure without greater leverage effects. In addition the housing, which is constructed as a closed profile, takes over protective functions for the setting device with torsion bars and controller.

According to a further particularly advantageous embodiment of the invention multiple shapings each having a horizontally oriented bore, are formed on the housing. Correspondingly the auxiliary frame is provided in correspondence thereto with horizontally oriented bores so that the housing can be fastened on the auxiliary frame via a horizontally oriented threaded connection. The horizontal threaded connection is particularly advantageous with regard to the smaller required mounting space.

BRIEF DESCRIPTION OF THE DRAWING

Further advantages features and applications of the present invention become apparent for then following description in connection with the exemplary embodiment shown in the drawing.

In the description, in the claims and in the drawing the terms and assigned reference numerals listed in the list below are used.

In the drawing it is shown in:

Figure 1:
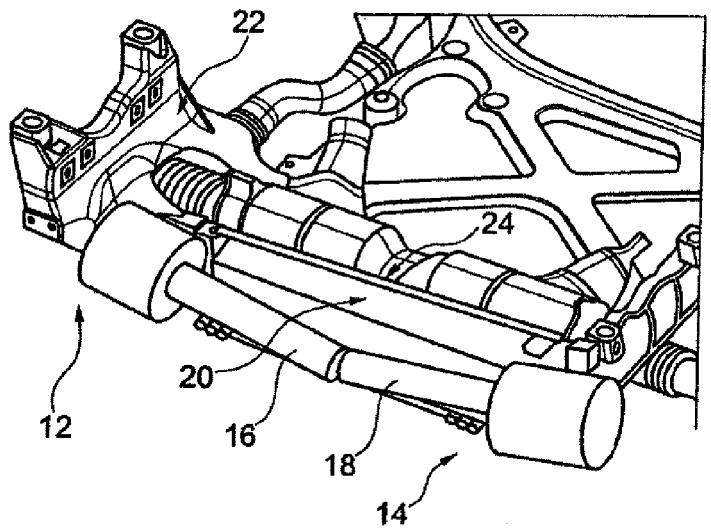
Figure 2:
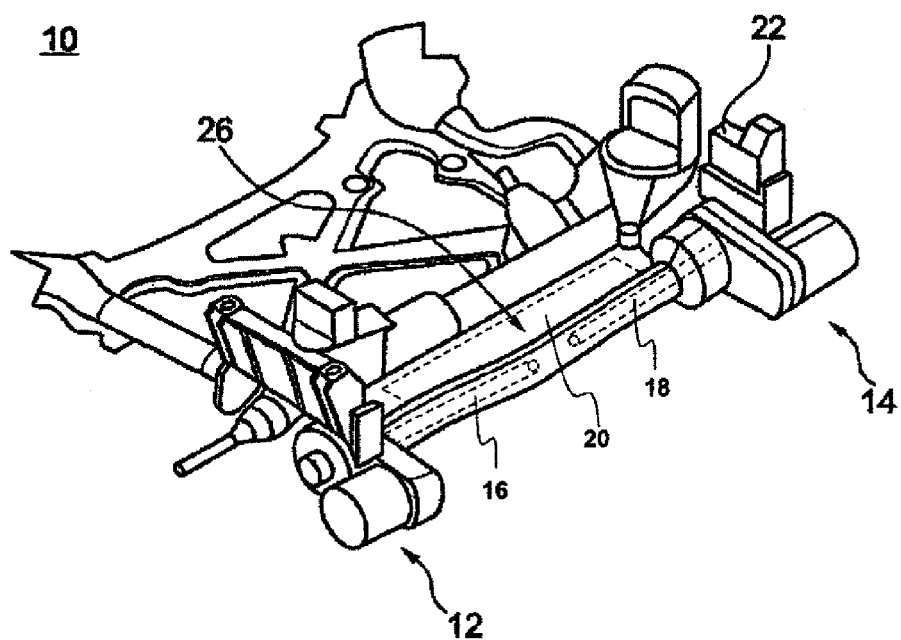

FIG. 1 an adjustable wheel suspension for the wheels of an axle of a motor vehicle according to the state of the art, and FIG. 2 an adjustable wheel suspension constructed according to the invention.

DETAILED DESCRIPTION OF PREFERRED EMBODIMENTS

In the following description and in the figures same components and parts are designated with the same reference numerals insofar as no further differentiation is required or useful to avoid repetition.

FIG. 1 shows an adjustable wheel suspension overall designated with the reference numeral 10 for the wheels of an axle of a motor vehicle. In the present case the wheels are not shown for reasons of clarity.

As can be seen in FIG. 1 each axle side is assigned a torsion bar 16, 18, which can be adjusted via an setting device. The two torsion bars 16, 18 are arranged so as to be aligned with each other over regions. The forces and torques required for adjusting the torsion bars 16, 18 are provided by the setting device 12 or 14.

In addition a controller 20 is provided via which an electronic open loop/closed loop control of the setting device 12, 14 occurs.

As can further be seen from FIG. 1, the torsion bars 16, 18 are fastened via their assigned setting device 12, 14 on an auxiliary frame 22. In addition the controller 20 is also supported on the auxiliary frame 22.

For ensuring sufficient stability, the auxiliary frame 22 has a transverse member 24.

As can be seen from FIG. 1, the selected arrangement of the components setting device 12, 14, torsion bars 16, 18 and controller 20 requires a relatively large mounting space on the auxiliary frame 22. In addition the auxiliary frame 22 has to be reinforced in order to ensure absorption of the generated forces and torques.

This is where the invention comes into play:

As can be seen in FIG. 2 the components setting device 12, 14, assigned torsion bars 16, 18 and controller 20 are integrated in a common housing 26 which is fastened as integral component on the auxiliary frame 22. The perimeter of the torsion bars 16, 18 and controller 18 inside housing 26 are shown in dashed lines. The housing 26 is oriented in transverse direction FQ of the vehicle before the auxiliary frame 22.

The integration in a common housing 26 enables an arrangement which saves mounting space and facilitates mounting of the individual components. Because acting forces and torques can also be absorbed by means of the hosing 26, the forces and torques acting on the fastening site between housing 26 and auxiliary frame are strongly reduced so that the reinforcement of the auxiliary frame 22 required in the state of the art is no longer required.

The orientation of the housing 26 in transverse direction FQ of the vehicle and the corresponding dimensioning and configuration of the housing 26 additionally ensures that the housing 26 takes over the function of the transverse member 24 of the auxiliary frame. This means that the auxiliary frame 22 can be constructed without front transverse member as shown in FIG. 2.

What is claimed is:

1. An adjustable wheel suspension for wheels of an axle of a motor vehicle, comprising:
    adjustable torsion bars respectively assigned to the wheels in one to one correspondence and operatively connected to the wheels, said torsion bars being partially aligned with each other and oriented in transverse direction of the vehicle;
    a setting device for adjusting the torsion bars respectively assigned to each of the torsion bars and controllable via a controller, each of the torsion bars being respectively supported via the setting device and the controller on an auxiliary frame of the motor vehicle; and
    a housing fastenable on the auxiliary frame as integral component and configured and dimensioned so as to provide sufficient stability to enable construction of the auxiliary frame without a transverse member,
    wherein the setting devices, the controller, and the torsion bars are arranged entirely in the housing.

2. The adjustable wheel suspension of claim 1, wherein the housing is configured as a closed profile.

3. The adjustable wheel suspension of claim 2, wherein the closed profile has a circular, rectangular or triangular cross section.

4. The adjustable wheel suspension of claim 1, wherein multiple shapings are formed on the housing, each having a horizontal bore, said auxiliary frame having horizontally oriented bores corresponding to the horizontal bore of the shapings, said housing being fastened on the auxiliary frame via a horizontally oriented threaded connection.

* * * * *

UNITED STATES PATENT AND TRADEMARK OFFICE
CERTIFICATE OF CORRECTION

PATENT NO. : 9,446,653 B2
APPLICATION NO. : 14/407863
DATED : September 20, 2016
INVENTOR(S) : Andreas Schindler et al.

It is certified that error appears in the above-identified patent and that said Letters Patent is hereby corrected as shown below:

On the Title Page

And in the Specification, Column 1, please correct the title "ADJUSTABLE WHEEL SUSPSENSION FOR THE WHEELS OF AN AXLE OF A MOTOR VEHICLE" to read
-- ADJUSTABLE WHEEL SUSPENSION FOR THE WHEELS OF AN AXLE OF A MOTOR VEHICLE --.

Signed and Sealed this
Tenth Day of January, 2017

Michelle K. Lee
*Director of the United States Patent and Trademark Office*